(12) United States Patent
Kobayashi et al.

(10) Patent No.: US 11,205,272 B2
(45) Date of Patent: Dec. 21, 2021

(54) INFORMATION PROCESSING APPARATUS, ROBOT SYSTEM, INFORMATION PROCESSING METHOD AND PROGRAM

(71) Applicant: CANON KABUSHIKI KAISHA, Tokyo (JP)

(72) Inventors: Toshihiro Kobayashi, Tokyo (JP); Tatsuya Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 182 days.

(21) Appl. No.: 16/424,316

(22) Filed: May 28, 2019

(65) Prior Publication Data

US 2019/0370974 A1 Dec. 5, 2019

(30) Foreign Application Priority Data

Jun. 1, 2018 (JP) .............................. JP2018-106096

(51) Int. Cl.
| | | |
|---|---|---|
| *G06T 7/13* | (2017.01) | |
| *G06T 7/174* | (2017.01) | |
| *G06T 7/73* | (2017.01) | |
| *G06T 3/40* | (2006.01) | |
| *G06T 5/20* | (2006.01) | |
| *B25J 9/16* | (2006.01) | |
| *G06T 5/00* | (2006.01) | |

(52) U.S. Cl.
CPC .............. *G06T 7/13* (2017.01); *B25J 9/1697* (2013.01); *G06T 3/40* (2013.01); *G06T 5/003* (2013.01); *G06T 5/20* (2013.01); *G06T 7/174* (2017.01); *G06T 7/74* (2017.01); *G06T 2207/20024* (2013.01); *G06T 2207/20092* (2013.01); *G06T 2207/20201* (2013.01)

(58) Field of Classification Search
CPC .. G06T 7/13; G06T 7/174; G06T 7/74; G06T 3/40; G06T 5/20; G06T 5/003; G06T 2207/20201; G06T 2207/20024; G06T 2207/20092; G06T 7/75; G06T 2207/20016; G06T 2207/30164; B25J 9/1697
USPC ......................................... 382/103
See application file for complete search history.

(56) References Cited

U.S. PATENT DOCUMENTS

| | | | | |
|---|---|---|---|---|
| 2005/0243350 A1* | 11/2005 | Aoyama | ................... | G06T 7/13 358/1.9 |
| 2007/0285441 A1* | 12/2007 | Fukuoka | ................... | G06T 7/13 345/660 |
| 2009/0285466 A1* | 11/2009 | Hipp | ..................... | G06T 7/0014 382/131 |

(Continued)

FOREIGN PATENT DOCUMENTS

JP          5241423 B2          7/2013

*Primary Examiner* — Ali Bayat
(74) *Attorney, Agent, or Firm* — Canon U.S.A., Inc. IP Division

(57) ABSTRACT

An apparatus includes an input unit configured to input a captured image of a target, a generation unit configured to generate a plurality of conversion images based on the captured image, a detection unit configured to detect edges in the plurality of conversion images, a determination unit configured to determine reliability of the edges detected in corresponding regions in the conversion images and the captured image, and a selection unit configured to select one of the edges for each region in the captured image based on the determined reliability.

7 Claims, 12 Drawing Sheets

(56) References Cited

U.S. PATENT DOCUMENTS

| | | | | |
|---|---|---|---|---|
| 2010/0002775 A1* | 1/2010 | Huang | ............... | H04N 19/176 375/240.24 |
| 2010/0183225 A1* | 7/2010 | Vantaram | ............... | G06T 7/155 382/173 |
| 2013/0230235 A1* | 9/2013 | Tateno | ............... | G06T 19/003 382/154 |
| 2015/0170336 A1* | 6/2015 | Lapointe | ............... | G06T 3/403 382/298 |

* cited by examiner

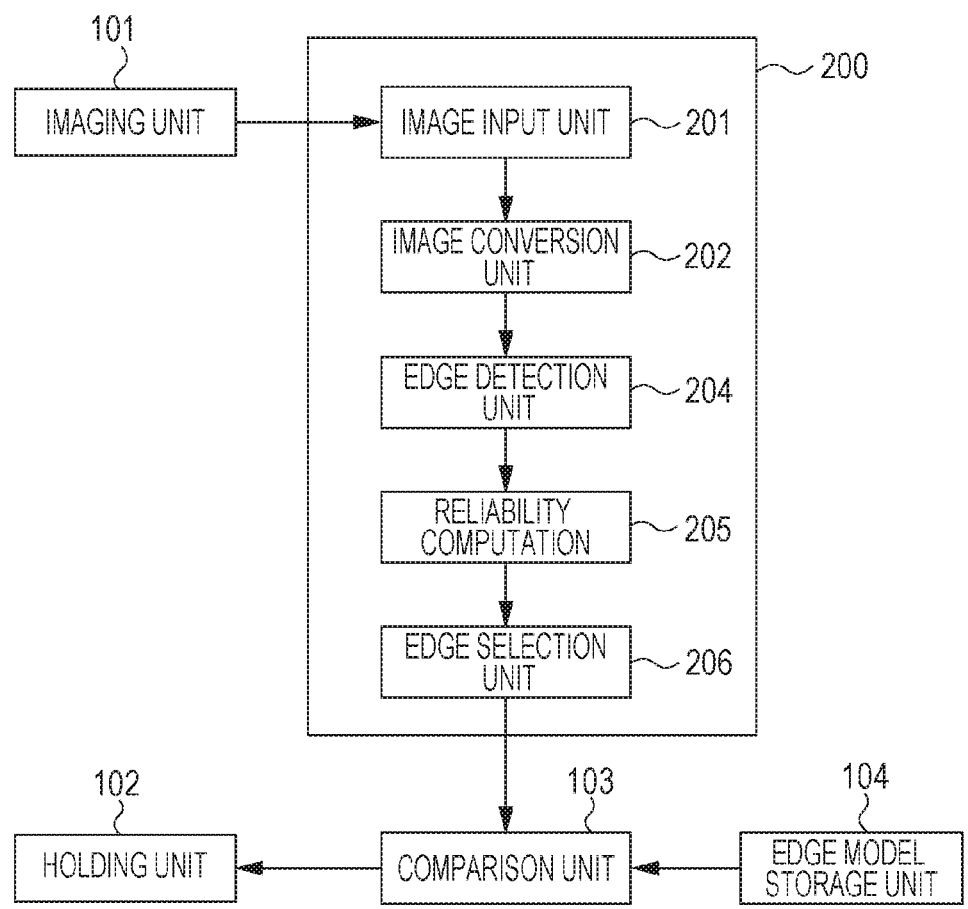

FIG. 7

INFORMATION PROCESSING APPARATUS, ROBOT SYSTEM, INFORMATION PROCESSING METHOD AND PROGRAM

BACKGROUND OF THE INVENTION

Field of the Invention

The aspect of the embodiments relates to an information processing apparatus, a robot system, an information processing method, and a storage medium.

Description of the Related Art

Apparatuses which image a target, such as one of components arranged at random, using an imaging apparatus and estimate a 3D position and orientation to hold and operate the target have been proposed. Such an apparatus detects an edge of the target in the captured image and compares the edge with an edge of an image of the target recorded in advance or an edge of a geometric model to estimate a position and orientation.

Japanese Patent No. 5241423 discloses a method for appropriately performing such comparison by determining a reduction rate of image data such that positional accuracy of edges becomes a predetermined value or more based on sharpness of the edges even in a case where image deterioration, such as defocusing, occurs.

However, according to the technique disclosed in Japanese Patent No. 5241423, a constant reduction rate is set in an image, and therefore, in a case where uneven image deterioration occurs in individual regions in the captured image, sufficient positional accuracy of an edge may not be obtained depending on a region. Therefore, in the technique of Japanese Patent No. 5241423, the comparison may fail or estimation accuracy of the position and orientation may be degraded.

SUMMARY OF THE INVENTION

According to an aspect of the embodiments, an apparatus includes an input unit configured to input a captured image of a target, a generation unit configured to generate a plurality of conversion images based on the captured image, a detection unit configured to detect edges in the plurality of conversion images, a determination unit configured to determine reliability of the edges detected in corresponding regions in the conversion images and the captured image, and a selection unit configured to select one of the edges for each region in the captured image based on the determined reliability.

Further features of the disclosure will become apparent from the following description of exemplary embodiments with reference to the attached drawings.

BRIEF DESCRIPTION OF THE DRAWINGS

FIG. 2A is a diagram illustrating an example of a functional configuration of a robot system according to a first embodiment.

FIG. 7 is a diagram illustrating examples of filters to be selected by a filter selection unit.

DESCRIPTION OF THE EMBODIMENTS

Hereinafter embodiments of the disclosure will be described with reference to the accompanying drawings.

First Embodiment

In this embodiment, an apparatus which accurately performs the edge comparison of a target so that a position and orientation is computed even in a case where a motion blur occurs in a captured image due to a shift of an imaging unit or the target will be described. As for the motion blur, characteristics and a degree of image deterioration are changed depending on a distance between an imaging unit and a target, a relative shift direction between the imaging unit and the target, or shift speeds of the imaging unit and the target. Therefore, in general, different positions in an image have different degrees of image deterioration caused by the motion blur, that is, the image deterioration is uneven.

In this embodiment, an information processing apparatus 200 described below generates conversion images by reducing a size of a captured image in different magnifications and performs edge detection on the individual conversion images. By reducing a size of an image in a plurality of magnifications, optimum edges are detected relative to the image deterioration in one of the conversion images. Since degrees of image deterioration are uneven in an image, optimum edges are detected in different conversion images. The information processing apparatus 200 computes reliability of results of the edge detection based on sharpness of a luminance gradient value. The reliability indicates stability of the edge detection. The reliability is defined by a difference between luminance gradients of adjacent pixels. The information processing apparatus 200 selects an edge having a highest reliability in the edges detected in the plurality of conversion images as an optimum edge for each region. In this way, only an edge which is less affected by the image deterioration which is unevenly generated in the image is selected for each region. A comparison unit 103 described below computes a position and orientation of a target by comparing a selected edge with an edge of a defined 3D geometric model. By this, in this embodiment, even in a case where uneven image deterioration is generated for individual regions in a captured image due to a motion blur, for example, comparison with an edge of the target is accurately performed so that a position and orientation is computed.

Figure 1:
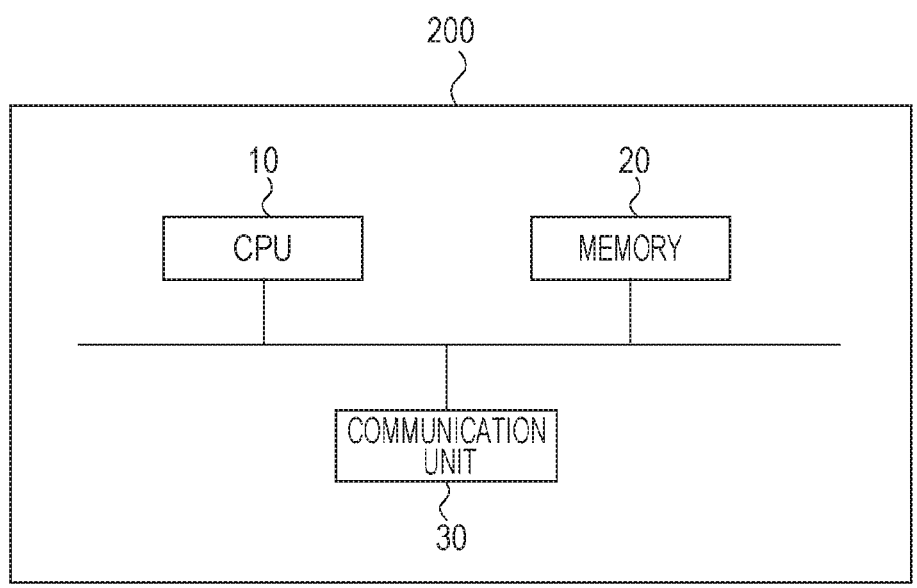
FIG. 1 is a diagram illustrating an example of a hardware configuration of an image processing apparatus.

FIG. 1 is a diagram illustrating an example of a hardware configuration of the image processing apparatus 200.

The information processing apparatus 200 includes a central processing unit (CPU) 10, a memory 20, and a communication unit 30. The CPU 10 controls the entire information processing apparatus 200. The memory 20 stores programs, data to be used when the CPU 10 executes processes based on the programs, and the like. The communication unit 30 connects the information processing apparatus 200 to a network and controls communication with other systems and other apparatuses. When the CPU 10 executes the processes based on the programs stored in the memory 20, functional configurations of the information processing apparatus 200 illustrated in FIGS. 2A and 6 described below and processes performed by the information processing apparatus 200 in accordance with flowcharts of FIGS. 3A, 3B, and 8 described below are realized.

FIG. 2A is a diagram illustrating an example of a functional configuration of a robot system according to the first embodiment. In FIG. 2A, rectangle frames indicate functional modules, which perform various processes of this embodiment and arrow marks indicate a flow of data. The robot system includes the information processing apparatus 200 according to this embodiment and an imaging unit 101 and a comparison unit 103, which are connected to the information processing apparatus 200. The configuration in FIG. 2A is merely an example and the aspect of the embodiments is not limited to the illustrated configuration.

The imaging unit 101 obtains an image by capturing an environment 302 including a plurality of targets 301 disposed therein (hereinafter referred to as a captured image 310). The imaging unit 101 is connected to the information processing apparatus 200 when being used and a captured image is supplied to an image input unit 201. In this embodiment, a conveying unit 303 is provided and the imaging unit 101 is fixed in the conveying unit 303.

A holding unit 102 performs an operation of holding one of the plurality of targets 301 disposed in the environment 302, moving the target 301 to another position, and placing the target 301 in the position. In this embodiment, the holding unit 102 is realized by a combination of a robot arm included in the conveying unit 303 and an end effector, which performs a holding operation on the targets 301.

Figure 2B:
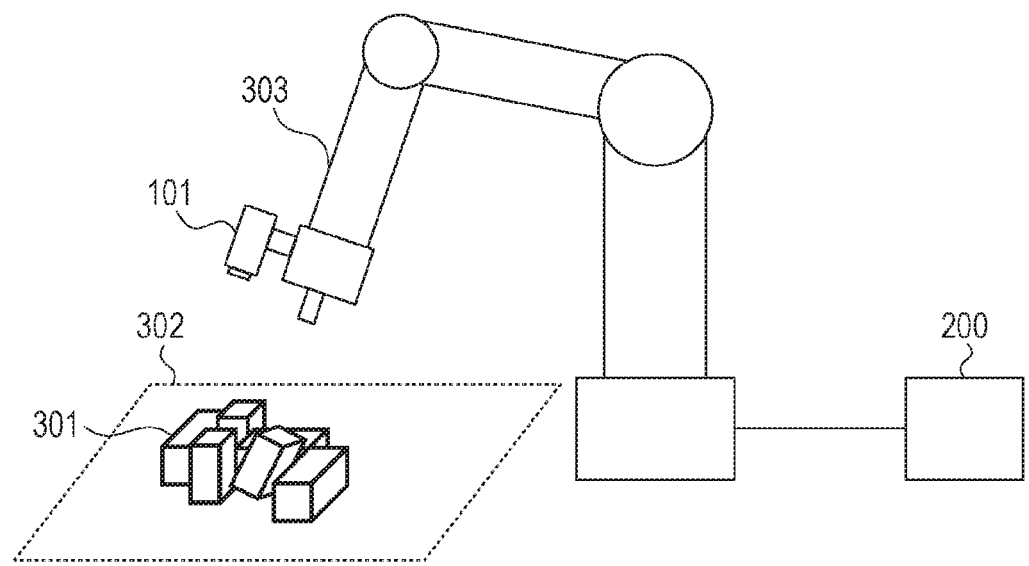
FIG. 2B is a diagram illustrating the relationship among an imaging unit, a target, an environment, and a conveyance unit.

FIG. 2B is a diagram illustrating the relationship among the imaging unit 101, the targets 301, the environment 302, and the conveying unit 303. The imaging unit 101 disposed over the environment 302 captures an image of the plurality of targets 301 disposed in the environment 302 at random. The imaging unit 101 is fixed on the conveying unit 303 including the robot arm. To save time for processing, the imaging unit 101 images the targets 301 during a movement of the conveying unit 303. Therefore, the captured image 310 includes a motion blur.

The image 310 captured by the imaging unit 101 is input to the information processing apparatus 200 through the image input unit 201.

An image conversion unit 202 converts the input captured image 310 by image processing to generate a plurality of conversion images 311*a* to 311*d*. The image conversion unit 202 transmits the generated conversion images 311*a* to 311*d* to an edge detection unit 204.

The edge detection unit 204 performs an edge detection process on the conversion images 311*a* to 311*d*. The edge detection unit 204 generates a detection edge list 320 and a luminance gradient value map to be transmitted to a reliability computation unit 205. The detection edge list 320 and the luminance gradient value map will be described below.

The reliability computation unit 205 computes reliability of edges based on the detection edge list 320 and the luminance gradient value map which are generated by the edge detection unit 204. A method for calculating reliability will be described below. The reliability computation unit 205 records a computed reliability in a detection edge reliability 334 of detection edge information 330 included in the detection edge list 320 to update the detection edge reliability 334. The reliability computation unit 205 transmits the updated detection edge list 320 to an edge selection unit 206.

The edge selection unit 206 obtains the detection edge reliability 334 from the detection edge list 320 and selects one of the edges in the conversion images 311*a* to 311*d* which has a highest reliability to generate a selection edge list 340. The edge selection unit 206 transmits the generated selection edge list 340 to the comparison unit 103. The selection edge list 340 will be described below.

The comparison unit 103 computes position and orientations of the targets 301 which have been captured in the captured image 310 based on the selection edge list 340 generated by the edge selection unit 206 and a model edge list stored in an edge model storage unit 104. The comparison unit 103 transmits the computed position and orientations of the targets 301 to the holding unit 102.

The edge model storage unit 104 stores information on edge models of the targets 301. Specifically, each of the edge models stored in the edge model storage unit 104 includes a plurality of 3D edges constituting edges of the targets 301. The edge model storage unit 104 stores the model edge list, which is a group of model edge information in which information on the 3D edges is described. Each of the model edge information includes a 3D coordinate of an edge in a coordinate system of the targets 301, a direction of the edge, and an ID for identifying the edge. The edge model storage unit 104 transmits the stored model edge list to the comparison unit 103.

Figure 3A:
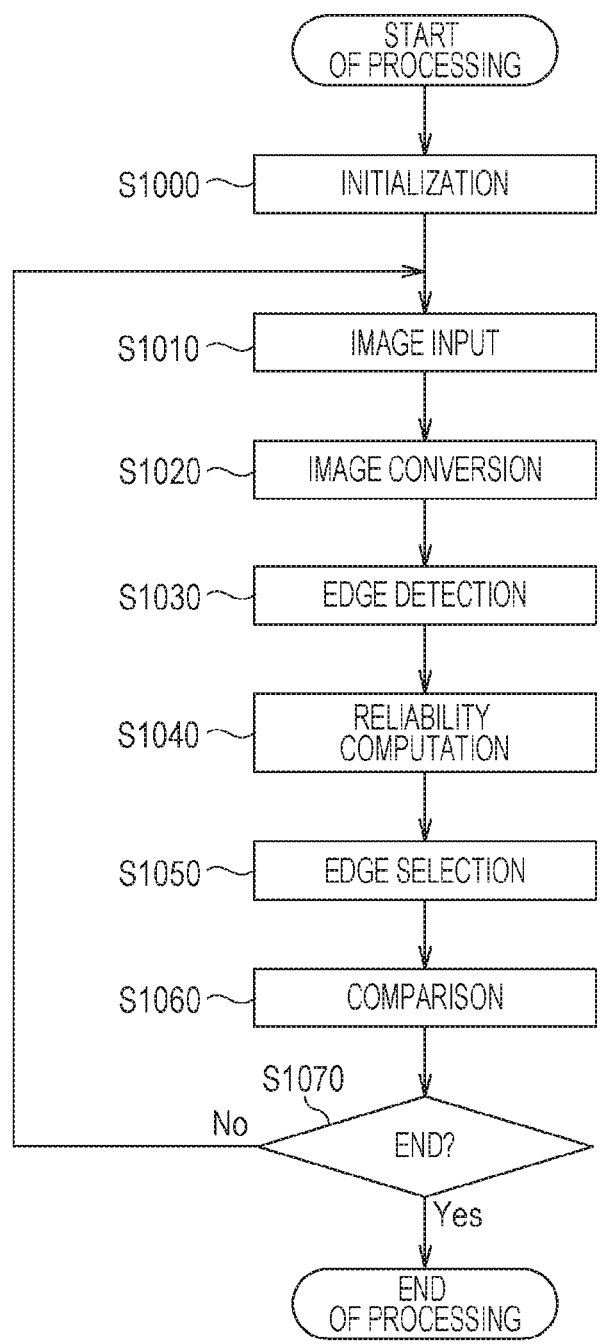
FIGS. 3A and 3B are flowcharts of an example of information processing according to the first embodiment.

Control of this embodiment having the configuration described above will be described below. FIG. 3A is a flowchart of a process performed by the robot system.

S1000

An initialization process is performed when the apparatus is activated. The initialization process in step S1000 includes activation of the imaging unit 101 and a process of reading the model edge list from an outside and storing the model edge list in the edge model storage unit 104.

S1010

The imaging unit 101 captures an image of the plurality of targets 301 disposed in the environment 302 and transmits the image to the image input unit 201. The image input unit 201 receives the captured image 310.

S1020

The image conversion unit 202 converts the supplied captured image 310 by image processing to generate a plurality of conversion images 311*a* to 311*d*. In this embodiment, the image conversion unit 202 generates the conversion images 311*a* to 311*d* by reducing a size of the captured image 310 in a plurality of magnifications (1.0, 0.5, 0.25, and 0.125). The process in step S1020 is an example of a process of generating a plurality of conversion images based on a captured image.

S1030

The edge detection unit 204 performs an edge detection process on the conversion images 311*a* to 311*d* to generate the detection edge list 320 and the luminance gradient value map.

The edge detection unit 204 performs the edge detection by applying the Canny filter to the conversion images 311*a* to 311*d*. The edge detection unit 204 generates a luminance gradient value map storing luminance gradient values of individual pixels and a luminance gradient direction map storing luminance gradient directions of the individual pixels for each of the conversion images 311*a* to 311*d* while performing the edge detection using the Canny filter. In this embodiment, a luminance gradient value G(u, v) and a luminance gradient direction P(u, v) are computed in accordance with Equation 1. Here, "u" and "v" indicate indices of a pixel position in an image and "I(u, v)" indicates a luminance value in a pixel position (u, v). Furthermore, "$F_x$" and "$F_y$" indicate kernels in horizontal and vertical directions of the Prewitt filter, respectively. Moreover, "*" indicates a convolution operation.

$$f_u(u,v) = F_x * I(u,v)$$

$$f_v(u,v) = F_y * I(u,v)$$

$$G(u,v) = f_u(u,v)^2 + f_v(u,v)^2$$

$$P(u,v) = \tan^{-1}(f_v(u,v)/f_u(u,v)) \quad \text{Equation 1}$$

The edge detection unit 204 selects a pixel having a largest luminance gradient value as an edge candidate based on the luminance gradient value map and the luminance gradient direction map. The edge detection unit 204 determines a more probable edge candidate as an edge in accordance with the relationship between a luminance gradient value of the edge candidate and a luminance gradient value of a neighboring edge candidate. This process is performed by a general technique, and therefore, a description thereof is omitted. The edge detection unit 204 performs the edge detection process described above on the conversion images 311a to 311d to generate the detection edge list 320 including determined edges.

Figure 4A:
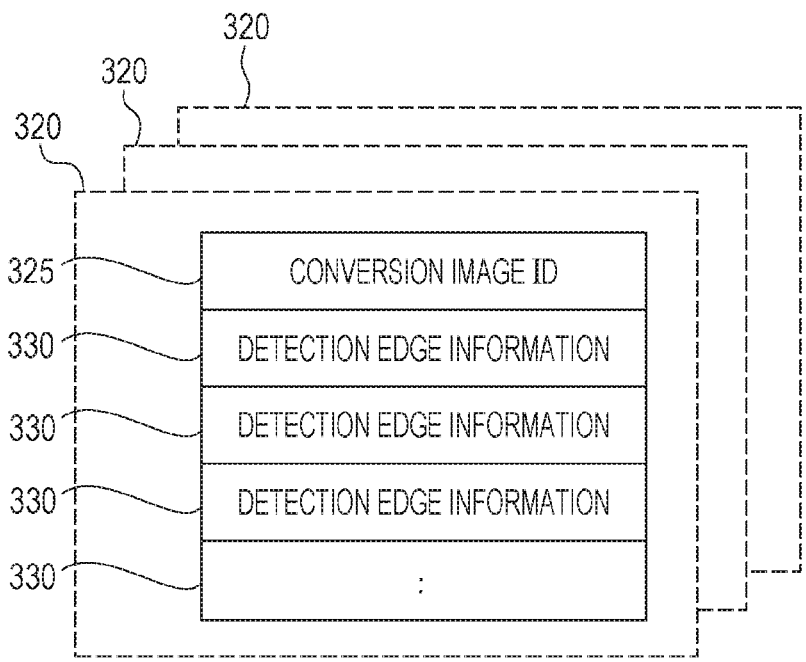
FIGS. 4A and 4B are diagrams illustrating an example of a detection edge list.

FIG. 4A is a diagram illustrating an example of the detection edge list 320. The detection edge list 320 includes a conversion image ID 325 indicating an ID for identifying a conversion image to be processed and a plurality of detection edge information 330. Only one conversion image ID 325 is included in one detection edge list 320. Only one detection edge list 320 is generated for one conversion image 311. Hereinafter, in a case where different detection edge lists 320 are discriminated from one another in a description below, symbols the same as conversion images are assigned. That is, the conversion images 311a to 311d correspond to detection edge lists 320a to 320d.

Figure 4B:
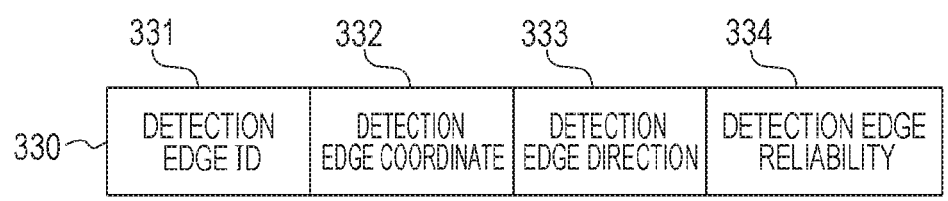

FIG. 4B is a diagram illustrating an example of the detection edge information 330. The detection edge information 330 includes a detection edge ID 331, a detection edge coordinate 332, a detection edge direction 333, and the detection edge reliability 334. The edge detection unit 204 generates a number of the detection edge information 330 corresponding to all detected edges. In this embodiment, a luminance gradient direction P is set as the detection edge direction 333. The edge detection unit 204 generates the detection edge list 320 using the plurality of detection edge information 330. Note that the edge detection unit 204 does not write a value of the detection edge reliability 334, which has not been computed in this stage. In step S1040 below, the reliability computation unit 205 writes the value.

The edge detection unit 204 generates the detection edge lists 320 for the individual conversion images 311a to 311d. Since the four conversion images are generated in this embodiment, four detection edge lists 320 are generated.

S1040

The reliability computation unit 205 computes reliability of the edges detected by the edge detection unit 204 based on the detection edge list 320 and the luminance gradient value map. The process in step S1040 is an example of a process of determining reliability of the edge detection performed on the plurality of edges detected in step S1030.

Hereinafter, the process performed by the reliability computation unit 205 will be described in detail.

Figure 5:
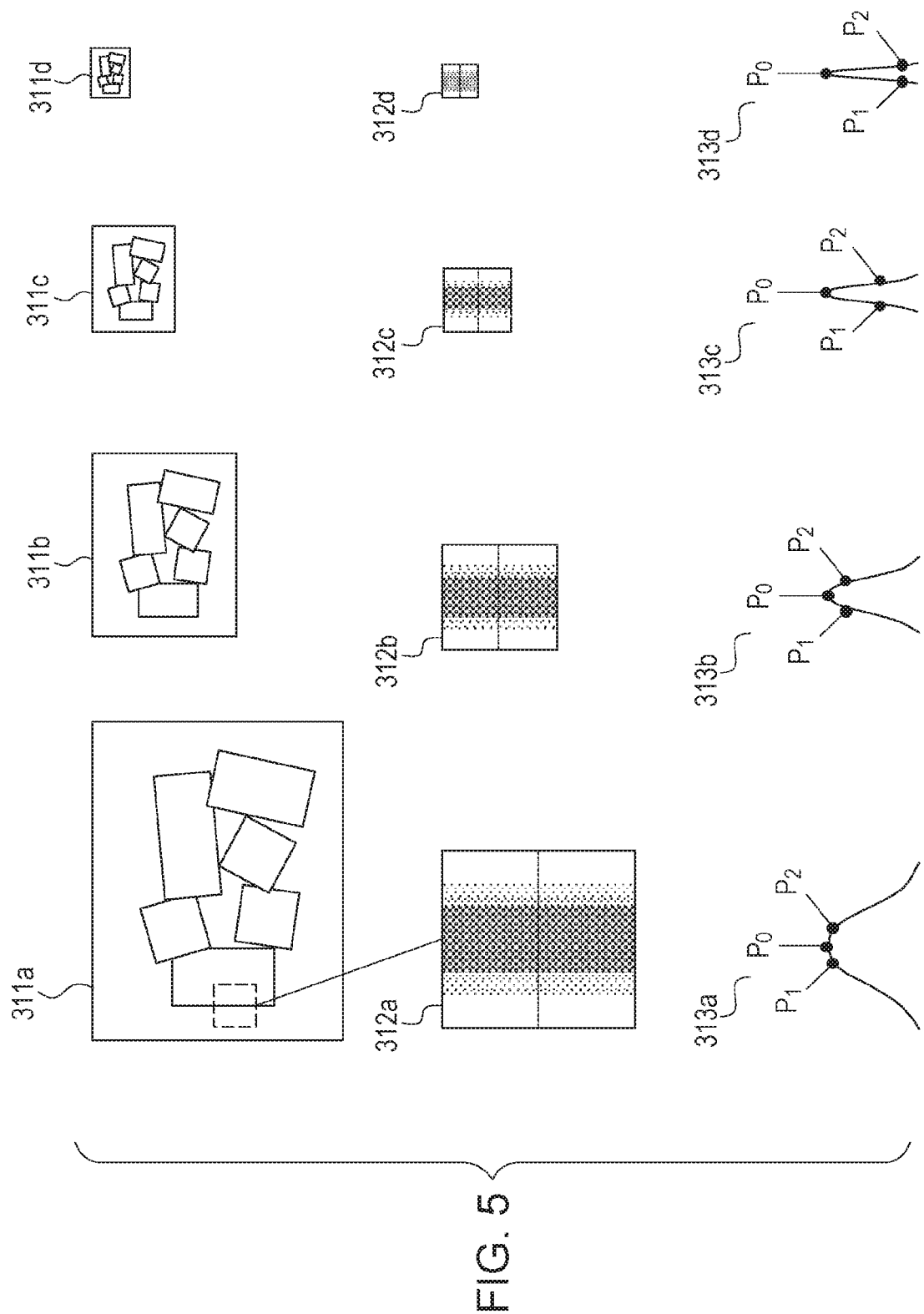
FIG. 5 is a concept diagram illustrating a process performed by a reliability computation unit.

FIG. 5 is a concept diagram illustrating content of the process performed by the reliability computation unit 205 in step S1040. Partial images 312a to 312d are obtained by extracting regions in the vicinity of a specific edge detected in the conversion images 311a to 311d. Furthermore, graphs 313a to 313d are obtained by plotting luminance gradient values of the partial images 312a to 312d in a direction orthogonal to an edge direction denoted by a dotted line in FIG. 5. $P_0$ indicates a luminance gradient value in a coordinate detected as an edge in each of the graphs 313a to 313d. Furthermore, $P_1$ indicates a luminance gradient value in a pixel disposed adjacent to $P_0$ on a left side. Furthermore, $P_2$ indicates a luminance gradient value in a pixel disposed adjacent to $P_0$ on a right side.

In FIG. 5, the edges represented by the partial images 312a to 312d have a blur in a horizontal direction due to a motion blur. Therefore, in the graph 313a, a change of the luminance gradient value in the vertical direction relative to the edge is moderate. Specifically, a change of the gradient value among $P_0$, $P_1$, and $P_2$ is small, coordinates of $P_0$, $P_1$, and $P_2$ are likely to be shifted due to noise or the like included in the image, and it is highly likely that a portion not to be an edge is mistakenly detected. In this embodiment, such an unstable edge is referred to as an edge of a low reliability. On the other hand, in the graph 313b corresponding to the conversion image 311b obtained by performing the size reduction in the magnification of 0.5 on the conversion image 311a, a luminance change among $P_0$, $P_1$, and $P_2$ is larger than that of the graph 313a. Specifically, the edge coordinates are difficult to be changed and it is less likely that a portion not to be an edge is mistakenly detected. Therefore, such a stable edge is seen to have a high reliability. The same is true of the graphs 313c and 313d. As a magnification of the size reduction of the conversion image 311 becomes small, a reliability becomes high since influence of the motion blur becomes relatively small. On the other hand, resolution of the image is lowered, and therefore, resolution performance and accuracy of an edge coordinate are lowered. Specifically, tradeoff occurs when a size of an image is reduced in the edge detection. In this embodiment, the reliability computation unit 205 computes a reliability R of an edge in accordance with Equation 2. Here, "G" indicates a luminance gradient value in Equation 1, and "X" indicates a magnification of each of the conversion images 311a to 311d. For example, in a case of the conversion image 311b, X is 0.5 since a magnification is 0.5. In Equation 2, a coefficient X prioritizes an edge of a large magnification (that is, an image is not subjected to the size reduction) when a difference between luminance gradients is in the same level. Specifically, the tradeoff of the image size reduction is represented by the coefficient X. Equation 2 represents stability of the edge detection by "sharpness" of a luminance gradient value in a portion in the vicinity of an edge. A value obtained by correcting X taking a magnification into consideration is defined as a reliability R.

$$R = X(2G(P_0) - G(P_2) - G(P_1)) \quad \text{Equation 2}$$

In S1040, the reliability computation unit 205 computes reliability of all the edges included in the detection edge list 320 in accordance with Equation 2 and writes values of the reliability in the detection edge reliability 334.

S1050

The edge selection unit 206 obtains the detection edge lists 320 and selects edges of high reliability to generate the selection edge list 340. Hereinafter, content of the process performed by the edge selection unit 206 will be described in detail.

Figure 4C:
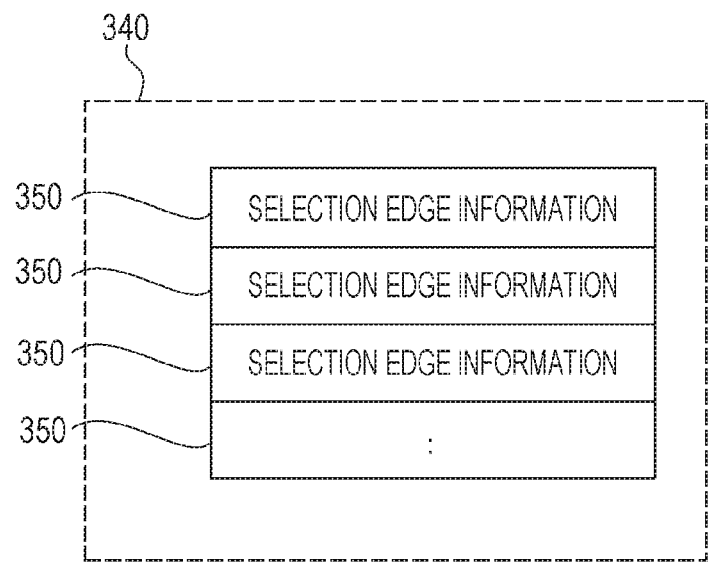
FIGS. 4C and 4D are diagrams illustrating an example of a selection edge list.
Figure 4D:
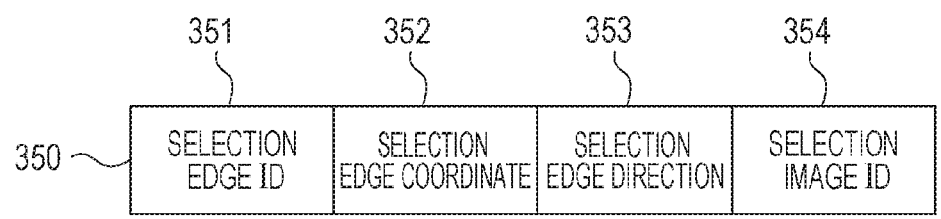

FIG. 4C is a diagram illustrating an example of the selection edge list 340. The selection edge list 340 includes a plurality of selection edge information 350. FIG. 4D is a diagram illustrating an example of the selection edge information 350. The selection edge information 350 includes a selection edge ID 351, a selection edge coordinate 352, a selection edge direction 353, and a selection image ID 354. The selection edge coordinate 352 is described as a pixel position in the captured image 310. The selection image ID 354 stores an ID (a value of the conversion image ID 325) indicating a type of the conversion image 311 used to generate the selection edge information 350. After converting the detection edge coordinates 332 into coordinates in the captured image 310, the edge selection unit 206 writes the coordinates of the edges selected from the conversion images 311a to 311d having different image sizes in the selection edge coordinate 352.

The edge selection unit 206 searches the detection edge list 320 corresponding to the conversion image 311a having a largest magnification (hereinafter referred to as a detection edge list 320a) for the detection edge information 330b to 330d which are edges of a lower level relative to an edge included in the detection edge information 330a which is an element of the detection edge list 320a. The edge selection unit 206 selects a largest one of the detection edge reliability 334a to 334d to generate the selection edge information 350. The edge selection unit 206 generates the selection edge list 340 using a plurality of selection edge information 350.

In S1050, a process of selecting an edge of a highest reliability performed by the edge selection unit 206 is further divided into a plurality of steps, and this will be described below in detail.

S1060

The comparison unit 103 obtains the selection edge list 340 generated by the edge selection unit 206 and the model edge list stored in the edge model storage unit 104 and computes position and orientations of the targets 301 which have been captured as the captured image 310 by means of a repetitive process. Specifically, the comparison unit 103 compares a coordinate and a direction obtained by projecting a 3D coordinate and a direction of a model edge to the captured image 310 in accordance with position and orientations of the current targets 301 with the selection edge list 340 and performs association. The comparison unit 103 computes translation and rotation components of the targets 301 of a smallest coordinate difference in the captured image 310 between the model edge and the selection edge information 350 which are associated with each other by nonlinear minimization.

S1070

The holding unit 102 performs an operation of holding the targets 301 based on the position and orientations of the targets 301. The holding unit 102 returns to step S1010 when the process illustrated in FIG. 3A is to be continued and terminates the process illustrated in FIG. 3A when the process illustrated in FIG. 3A is to be terminated.

Figure 3B:
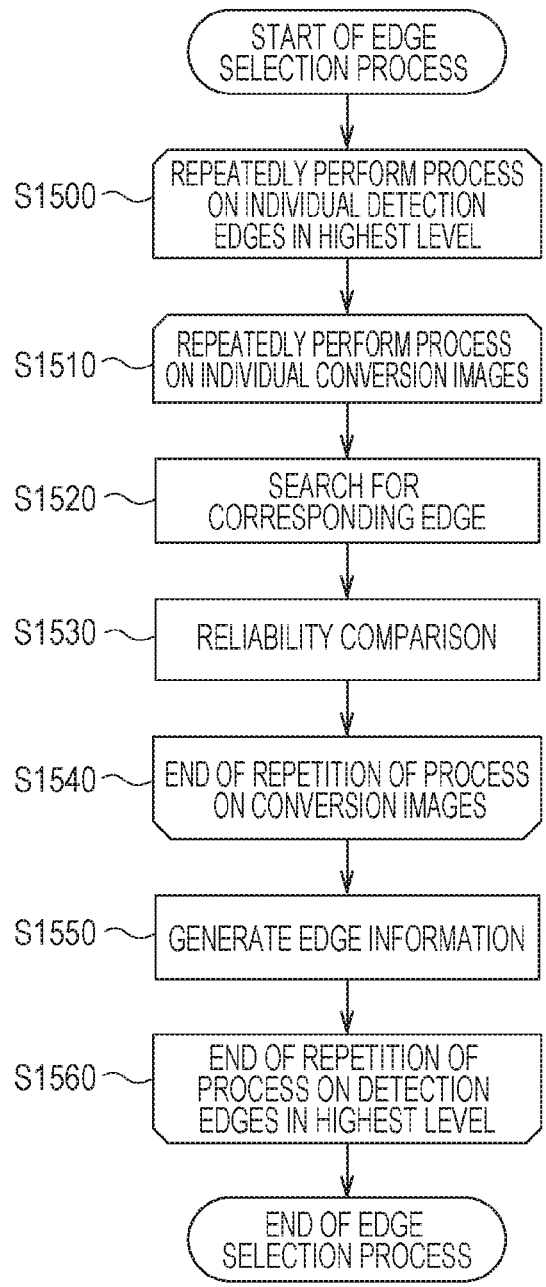

Next, the process in step S1050 will be described in detail. FIG. 3B is a flowchart of the process performed in step S1050. Hereinafter, content of the process performed by the edge selection unit 206 will be described with reference to the flowchart.

S1500

The edge selection unit 206 obtains the detection edge list 320a corresponding to the conversion image 311a of the largest magnification and extracts the detection edge information 330a one by one. Hereinafter, the edge selection unit 206 repeatedly performs a process from step S1510 to step S1560 on all the detection edge information 330a.

S1510

The edge detection unit 206 obtains the detection edge lists 320b to 320d corresponding to the conversion images 311a to 311d, respectively. The edge selection unit 206 repeatedly performs a process from step S1520 to step S1540 on all the detection edge lists 320b to 320d. Since the four conversion images are generated in this embodiment, the three detection edge list 320b to 320d are generated in a lower level. The edge selection unit 206 performs the process from step S1520 to step S1540 three times on the individual detection edge information 330a. Hereinafter, in the process from step S1520 to step S1540, a detection edge list to be processed among the detection edge lists 320b to 320d is denoted by a detection edge list 320i and corresponding detection edge information is denoted by detection edge information 330i.

S1520

The edge selection unit 206 searches the detection edge list 320i for the detection edge information 330i in a nearest neighbor relative to the detection edge information 330a in a predetermined region. Here, the edge selection unit 206 multiplies the detection edge coordinate 332a of the detection edge information 330a by a magnification of the conversion image 311i to extract the detection edge information 330i in the nearest neighbor in the predetermined region from the detection edge list 320i. In this embodiment, a magnification of 0.5 is used in the case of the conversion image 311b. A magnification of 0.25 is used in the case of the conversion image 311c. A magnification of 0.125 is used in the case of the conversion image 311d. The predetermined region in this embodiment indicates a region in a range in which a detection edge corresponding to the detection edge information 330a and a detection edge corresponding to the detection edge information 330i are seen to be detected in a substantially the same portion of the targets 301.

S1530

The edge selection unit 206 compares the detection edge reliability 334a of the detection edge information 330a with the detection edge reliability 334i of the searched detection edge information 330i and stores one of the detection edge information 330 (one of the detection edge information 330a to 330d) of a highest detection edge reliability. For convenience of the description, the detection edge information 330 of the highest reliability is referred to as a detection edge information 330m.

S1540

The edge selection unit 206 repeatedly performs the process from step S1520 to step S1530 to process the detection edge lists 320b to 320d.

S1550

As a result of the performance of the process from step S1520 to step S1530, the detection edge information 330m of the highest reliability is stored relative to the detection edge information 330a. The edge selection unit 206 generates the selection edge list 340 based on the detection edge information 330m.

The edge selection unit 206 divides a detection edge coordinate 332m of the detection edge information 330m by a magnification of a conversion image to convert the detection edge coordinate 332m into a coordinate of the captured image 310. For example, in a case where the detection edge coordinate 332m is detected in the conversion image 311c, the edge selection unit 206 divides the detection edge coordinate 332m by the magnification of 0.25 to convert the detection edge coordinate 332m into a coordinate of the image of the magnification of 1.0.

Subsequently, the edge selection unit 206 obtains the selection edge list 340 generated so far and determines whether the detection edge coordinate obtained after the conversion is included in the selection edge coordinate 352. When the determination is affirmative, the edge selection unit 206 terminates the process performed on the detection edge information 330a and proceeds to a next repetition (S1500). When the determination is negative, the edge selection unit 206 generates selection edge information 350 in accordance with the detection edge information 330m and adds the selection edge information 350 to the selection edge list 340.

S1560

The edge selection unit 206 repeatedly performs the process from step S1500 to step S1550 until all the detection edge information 330a is processed.

In this way, the edge selection unit 206 selects an edge of a highest reliability and generates the selection edge list 340 by the process from step S1500 to step S1560.

Although the case where image deterioration has occurred due to a motion blur is described in this embodiment, the disclosure may be employed in other cases. The method described in this embodiment is applicable to a case where uneven image deterioration has occurred in a captured image 310 irrespective of a reason. For example, in a case where the imaging unit 101 does not face the targets 301, uneven image deterioration may occur due to defocus even if a motion blur does not occur. Even in this case, edges of the targets 301 are accurately subjected to the comparison so that position and orientations may be computed by the method described in this embodiment.

Although a case where a normal image is captured by the imaging unit 101 is described in this embodiment, the disclosure is not limited to this. The imaging unit 101 may incorporates a 3D sensor and the image input unit 201 may obtain a range image or a 3D point group in addition to a normal image (a color image or a monochrome image).

In this embodiment, the case where the image conversion unit 202 performs size reduction on the captured image 310 in the magnifications of 1.0, 0.5, 0.25, and 0.125 to generate the conversion image 311a to 311d is illustrated as an example. However, the magnification employed in the image conversion unit 202 for the size reduction may not be four types, and an arbitrary value may be set as the magnification. Furthermore, the image conversion unit 202 may perform not only the size reduction but also enlargement.

Although the reliability computation unit 205 computes a reliability in accordance with Equation 2 as an example in this embodiment, the disclosure is not limited to this. In Equation 2, stabilities of coordinates of edges computed using the individual conversion images 311 including image deterioration are described by "sharpness" based on a luminance gradient difference among three points in the vicinity of the edges and are defined as reliability. The reliability may be indicated by any form as long as stabilities of edge coordinates detected in the same region in the plurality of conversion images 311 may be computed and compared with each other. For example, a coefficient of a predetermined function, such as a sigmoid function, may be estimated based on luminance gradients in the vicinity of the edges or a reliability may be defined in accordance with intensity of a luminance gradient. Furthermore, although the magnification of the conversion image 311 is used in multiplication and an edge detected by the conversion image 311 of a large magnification is employed in Equation 2, this term may be omitted where appropriate since this term is additional in terms of the comparison between reliability.

Although the case where the reliability computation unit 205 computes a reliability after the edge detection is performed is described as an example in this embodiment, the reliability may be computed in another timing. For example, in this embodiment, the edge detection unit 204 performs the edge detection in step S1030. Then the reliability computation unit 205 computes a reliability in step S1040. However, the reliability computation process in step S1040 may be performed in step S1030. Specifically, a reliability may be computed at a time point when the edge detection unit 204 computes a luminance gradient value map and a luminance gradient direction and a detection edge has not been determined.

Although the case where the edge selection unit 206 selects only one edge for each detection edge information 330a is described as an example in this embodiment, an edge may not be selected when the detection edge reliability 334 is low. In step S1530, in a case where the largest detection edge reliability 334m is smaller than a predetermined threshold value, the edge selection unit 206 omits the process in step S1550.

In step S1520 of this embodiment, the method for searching a region in a range in which detection edges corresponding to the detection edge information 330a and the detection edge information 330i are seen to be detected from substantially the same portion for a detection edge, which is performed by the edge selection unit 206 is described. Different regions may be obtained for different portions of the targets 301. Specifically, a threshold value of a distance in the searching may be set to an arbitrary value depending on a portion in the targets 301.

In this embodiment, the case where the comparison unit 103 compares the model edge list with the selection edge list 340 to compute position and orientations of the targets 301 is described as an example. The imaging unit 101 may measure a 3D point group on surfaces of the targets 301, and the comparison unit 103 may further compute position and orientations using the 3D point group. Specifically, the edge model storage unit 104 stores information on a plane (polygon) constituted by a 3D geometric model in addition to the model edge list. The comparison unit 103 may add constraint conditions for matching the 3D point group on the surfaces of the targets 301 in a current position and orientation with a polygon of the 3D geometric model to perform optimization.

According to this embodiment, the conveying unit 303 includes the robot arm and the imaging unit 101 is fixed on the robot arm. However, the conveying unit 303 may be a conveyor belt. In this case, although the imaging unit 101 is fixed to the environment 302, the targets 301 are mounted on the conveying unit 303, and the imaging unit 101 captures an image of the targets 301 while the conveying unit 303 is moved. Therefore, a motion blur occurs in the captured image 310.

As described above, according to the configuration of this embodiment, even in a case where uneven image deterioration occurs in regions in a captured image in a case where a motion blur occurs, for example, an edge which may be accurately compared may be selected. As a result, comparison with an edge of a target may be reliably performed so that a position and orientation may be computed.

Specifically, the information processing apparatus 200 generates conversion images by reducing a size of a captured image in a plurality of magnifications and performs edge detection on the individual conversion images. The information processing apparatus 200 computes reliability of results of the edge detection based on sharpness of luminance gradient values. The reliability indicates stability of the edge detection. The information processing apparatus 200 selects an edge having a highest reliability in the edges detected in the plurality of conversion images as an optimum edge for each region. The comparison unit 103 computes a position and orientation of a target by comparing a selected edge with an edge of a defined 3D geometric model. By this, even in a case where uneven image deterioration is generated for each region in a captured image due to a motion blur, for example, comparison with an edge of the target is accurately performed so that a position and orientation is computed.

Modification

Although the configuration in which the edge selection unit 206 performs the edge selection process before the comparison unit 103 performs the comparison process has been described, the edge selection process may be performed simultaneously with the comparison process performed by the comparison unit 103. Specifically, in step S1060, the comparison unit 103 projects the model edge to the captured image 310 based on the position and orientations of the current targets 301 and computes an image coordinate and a direction of an edge. Subsequently, the comparison unit 103 obtains the detection edge list 320a corresponding to the conversion image 311a of a highest level instead of the selection edge list 340. The comparison unit 103 selects an edge in which a difference between an image coordinate of the model edge and the detection edge coordinate 332a is smaller than a predetermined threshold value and in which a direction of the model edge is similar to a selection edge direction 353a. Thereafter, when the edge selection unit 206 performs the process from step S1510 to step S1560 described in the first embodiment, the model edge and a selection edge corresponding to the selection edge information 350 may be associated with each other.

Second Embodiment

In a second embodiment, an apparatus which may be employed in a case where comparison with an edge of a target is accurately performed so that a position and orientation is computed even when a motion blur occurs in a captured image due to a movement of an imaging unit 101 or a target will be described. In this embodiment, unlike the first embodiment, an information processing apparatus 200 performs, instead of the generation of a plurality of conversion images, selection of a plurality of edge detection filters having different kernel sizes for single captured image and performs edge detection using the plurality of edge detection filters. When edge detection is performed using a filter of a large kernel on a captured image of the same magnification, an effect equivalent to an effect obtained when edge detection is performed on a size-reduced captured image using a filter of the same magnification is obtained. The effect of the first embodiment may be obtained even when a method described in this embodiment is employed.

Figure 6:
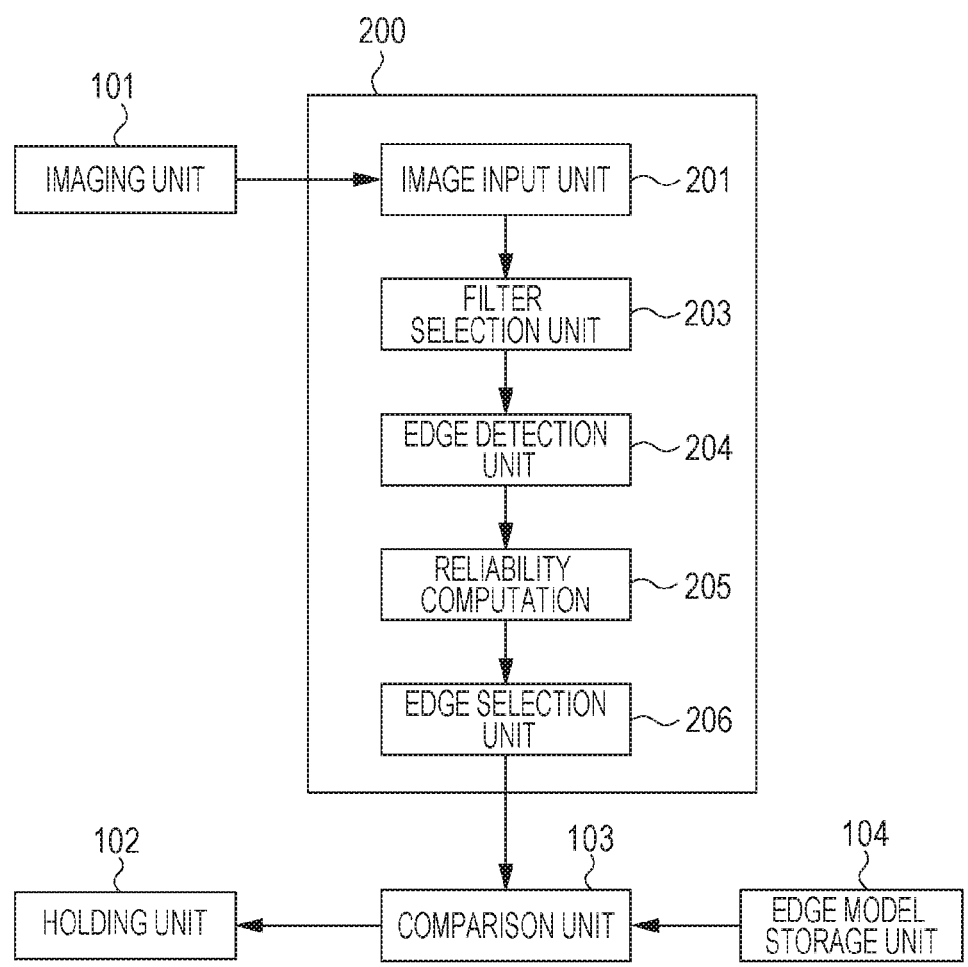
FIG. 6 is a diagram illustrating an example of a functional configuration of a robot system according to a second embodiment.

FIG. 6 is a diagram illustrating an example of a functional configuration and the like of a robot system according to the second embodiment. When FIG. 6 is compared with FIG. 2 of the first embodiment, a filter selection unit 203 is provided instead of the image conversion unit 202 in FIG. 6. Hereinafter, a difference from the first embodiment will be mainly described.

Figure 7:
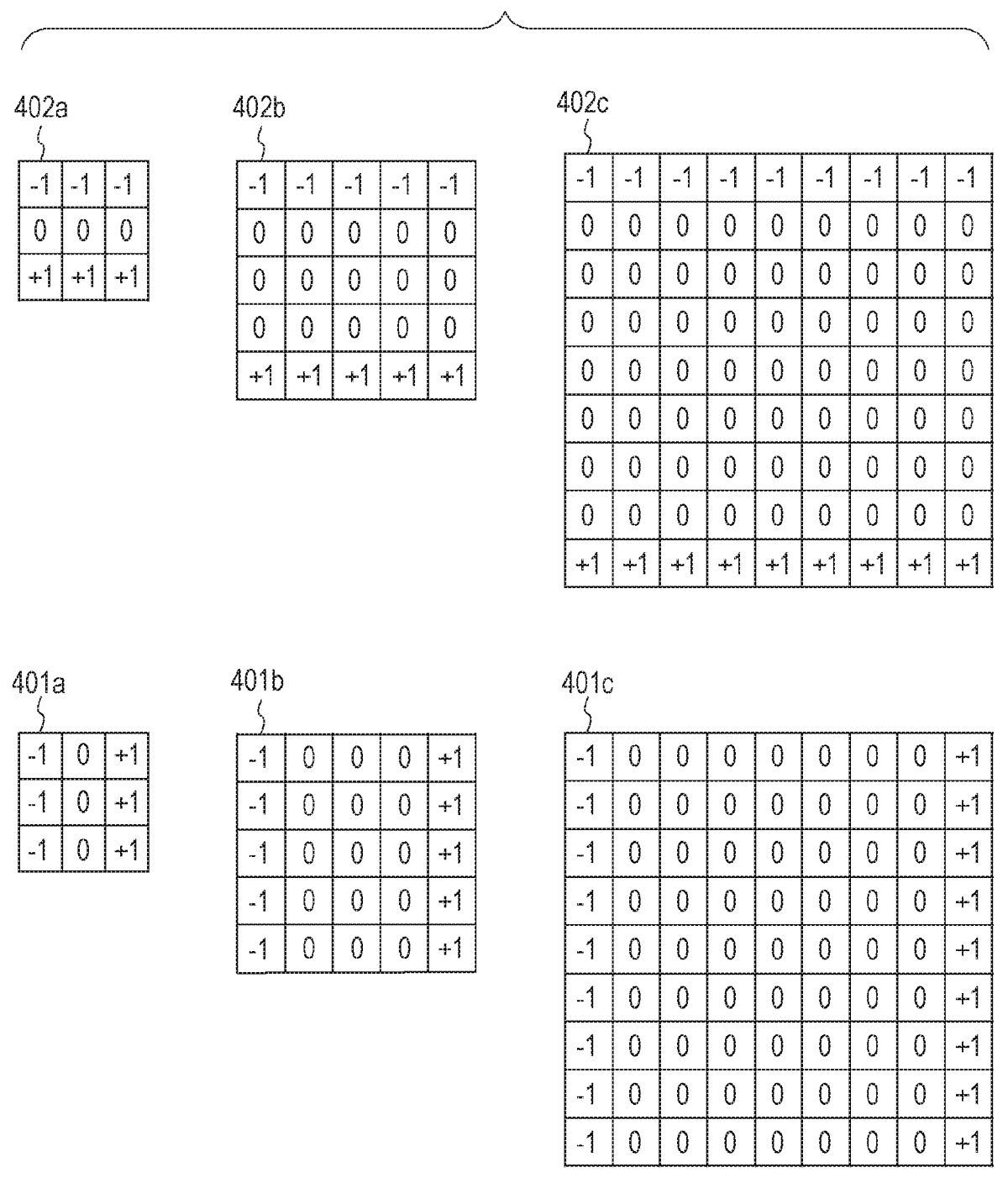

The filter selection unit 203 selects a plurality of filters to be used in edge detection in a captured image 310. FIG. 7 is a diagram illustrating examples of the filters to be selected by the filter selection unit 203. Filters 401a to 401c are kernels of the Prewitt filters which detect edges in a vertical direction and filters 402a to 402c are kernels of the Prewitt filters, which detect edges in a horizontal direction. Numerical values in boxes indicate coefficients of the filters. The filters 401a to 401c are equivalent to $F_x$ in Equation 1 of the first embodiment, and the filters 402a to 402c are equivalent to $F_y$ in Equation 1. In FIG. 7, the filter 401a has a kernel in a matrix of three rows by three columns, the filter 401b has a kernel in a matrix of five rows by five columns, and the filter 401c has a kernel in a matrix of nine rows by nine columns. Furthermore, all elements other than those in right and left ends in the kernels have a value of 0. When the filter 401a is applied to the captured image 310, an edge is computed based on luminance values of both sides of a current target pixel. When the filter 401b is applied to the captured image 310, an edge is computed based on luminance values of pixels which are two pixels away from the current target pixel on right and left sides. Similarly, when the filter 401c is applied to the captured image 310, an edge is computed based on luminance values of pixels which are four pixels away from the current target pixel. As described above, the filter selection unit 203 of this embodiment functions as the image conversion unit 202 of the first embodiment in essence. The filter selection unit 203 outputs kernels of selected filters to an edge detection unit 204. In this embodiment, the filters 401a to 401c and 402a to 402c are transmitted to the edge detection unit 204.

In this embodiment, the edge detection unit 204 performs edge detection using the filters selected by the filter selection unit 203 to generate a detection edge list 320. The detection edge list 320 in this embodiment includes a filter ID for specifying a filter used in the edge detection instead of the conversion image ID 325. Only one filter ID is included in one detection edge list 320. A detection edge information 330 is the same as that of the first embodiment. Only one detection edge list 320 is generated for one filter 401 (or 402).

When the edge detection unit 204 performs the edge detection, similarly to the first embodiment, a luminance gradient value G(u, v) and a luminance gradient direction P(u, v) are computed in accordance with Equation 1. In Equation 1, $F_x$ and $F_y$ indicate kernels of the filters 401a to 401c and 402a to 402c.

Figure 8:
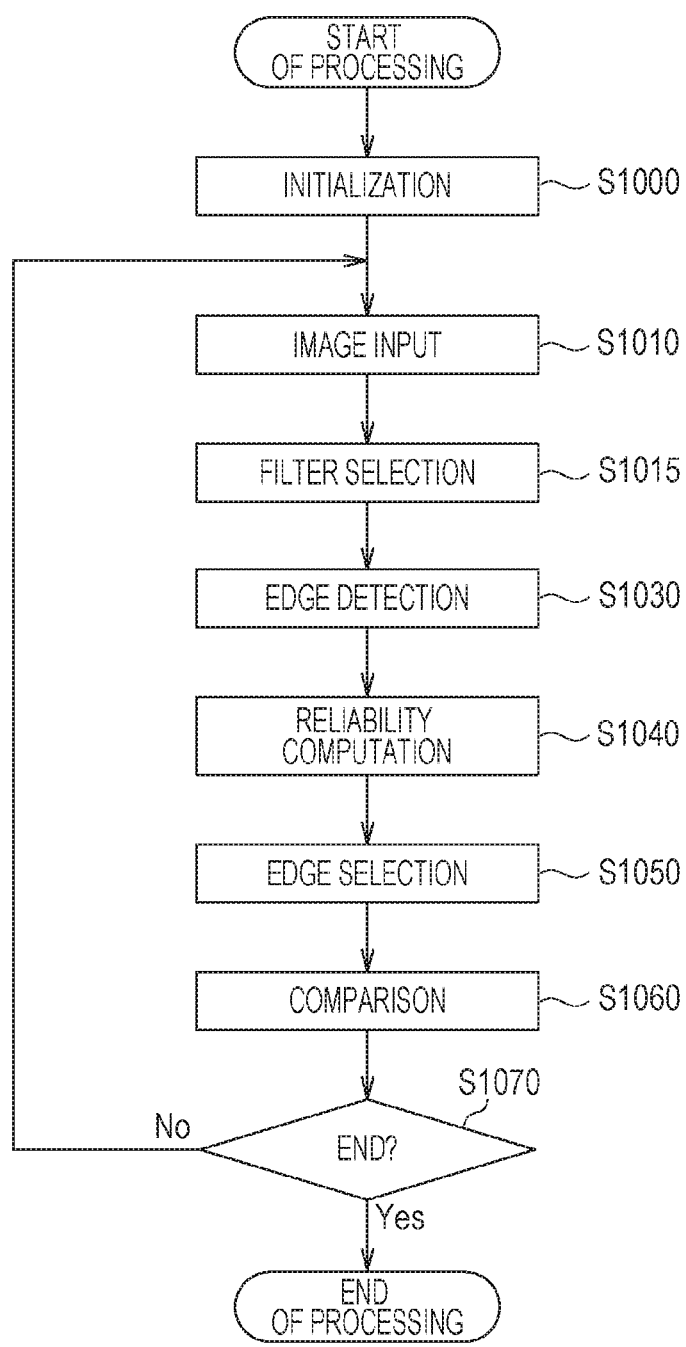
FIG. 8 is a flowchart of an example of information processing according to the second embodiment.

Control of this embodiment having the configuration described above will be described below. FIG. 8 is a flowchart of a process performed by a robot system. In this embodiment, step S1015 is provided instead of the process of step S1020 which performs image conversion in the first embodiment.

S1015

The filter selection unit 203 selects the filters 401a to 401c and the filters 402a to 402c to be used for the edge detection.

S1040

A reliability computation unit 205 obtains the detection edge list 320 and the luminance gradient value map obtained by the edge detection unit 204 to compute reliability of detected edges. In Equation 2, although $P_1$ indicates a luminance gradient value of a pixel disposed adjacent to $P_0$ on a left side and $P_2$ indicates a luminance gradient value of a pixel disposed adjacent to $P_0$ on a right side in the first embodiment, $P_1$ and $P_2$ are determined in accordance with a filter corresponding to the filter ID included in the detection edge list 320 in this embodiment. In a case of the filter 401a, an edge is computed using adjacent pixels, and therefore, $P_1$ and $P_2$ are determined using the adjacent pixels similarly to the first embodiment. In a case of the filter 401b, an edge is computed using pixels disposed two pixels away, and therefore, points positioned two pixels away from $P_0$ are referred to for $P_1$ and $P_2$. In a case of the filter 401c, points positioned four pixels away from $P_0$ are referred to for $P_1$ and $P_2$.

Although the filter selection unit 203 is configured such that non-zero elements in the kernels are +1 or −1 as illustrated in FIG. 7 in this embodiment, the disclosure is not limited to this. A filter in which coefficients around the center of the kernel are large may be employed.

As described above, according to the configuration of this embodiment, even in a case where an uneven image deterioration occurs in regions in a captured image due to a motion blur or the like, an edge which may be accurately compared may be selected. As a result, comparison with an edge of a target may be reliably performed so that a position and orientation may be computed.

Specifically, the information processing apparatus 200 performs, instead of the generation of a plurality of conversion images, selection of a plurality of edge detection filters having different kernels for single captured image and performs edge detection using the plurality of edge detection filters. The information processing apparatus 200 computes reliability of results of the edge detection based on sharpness of luminance gradient values. The reliability indicates stability of the edge detection. The information processing apparatus 200 selects an edge having a highest reliability in the edges detected by the plurality of filters as an optimum edge. A comparison unit 103 computes a position and orientation of a target by comparing the selected edge with an edge of a defined 3D geometric model. By this, even in a case where uneven image deterioration is generated in regions in a captured image due to a motion blur, for example, comparison with an edge of the target is accurately performed so that a position and orientation is computed.

Modification

Although the case where the filter selection unit 203 selects different filters of different sizes of kernel as an example, the aspect of the embodiments is not limited to this. The filter selection unit 203 may select a combination of a plurality of filters of different edge detection principles, such as a Prewitt filter, a Sovel filter, and a Laplacian filter, instead of a combination of filters of different kernel sizes.

Third Embodiment

In this embodiment, an apparatus which may be employed in a case where a position and orientation of a target is accurately computed even when a motion blur occurs in a captured image due to a movement of an imaging unit 101 or a target will be described. This embodiment is different from the first embodiment in that an information processing apparatus 200 assumes a plurality of point spread functions (PSF) caused by a motion blur relative to a captured image and generates conversion images by performing deblurring on the individual PSFs to generate conversion images. The information processing apparatus 200 computes reliability indicating stability of edge detection for edges detected in the conversion images based on sharpness of the luminance gradient values, and selects an edge of a highest reliability for each region. The effect of the first embodiment may be obtained even when a method described in this embodiment is employed.

A functional configuration and the like of the robot system according to this embodiment are the same as those of the robot system according to the first embodiment illustrated in FIG. 2. Hereinafter, a difference from the first embodiment will be mainly described.

An image conversion unit 202 converts a supplied captured image 310 by image processing to generate a plurality of conversion images 311a to 311d. In this embodiment, the image conversion unit 202 generates the conversion images 311a to 311d by performing deblurring on the captured image 310 a plurality of times. In this embodiment, the image conversion unit 202 assumes a plurality of shapes of PSFs deteriorated due to a motion blur and performs the deblurring using the individual PSFs to generate the conversion images 311a to 311d.

PSF is a function which defines spread of an image when a single point is captured. An ideal PSF in a state in which image deterioration does not occur has a single peak at a center. If the PSF is affected by a motion blur, the PSF indicates a trajectory of a movement during exposure. The PSF which is affected by a motion blur is not uniform in an image, and the PSF generally has different forms in different regions.

In this embodiment, the image conversion unit 202 generates PSFs when assuming a straight motion blur in a vertical direction, a straight motion blur in a horizontal direction and two types of diagonal straight motion blur. In a case where a shape of PSF matches a motion blur actually generated, a blur recover process using an inverse transform filter is performed on the captured image 310 using the PSF so that an image which is less affected by the motion blur is generated. In this embodiment, the Wiener filter is used as the inverse transform filter. The image conversion unit 202 applies the Wiener filter to the PSFs to generate the conversion images 311a to 311d using the captured image 310. As with the first embodiment, a reliability computation unit 205 computes reliability of edges detected in the conversion images 311a to 311d. In this case, an edge detected in one of the conversion images 311a to 311d which is generated using PSF which is most similar to an actual motion blur has a highest reliability. Since the PSF affected by a motion blur is uneven in an image, an edge selection unit 206 selects edges from different conversion images 311a to 311d in different regions. Therefore, the edge selection unit 206 selects an edge which is less affected by a motion blur from among the edges detected in the plurality of conversion images which have been subjected to the deblurring.

Control of this embodiment having such a configuration will be described hereinafter. A flowchart of this embodiment is the same as that according to the first embodiment illustrated in FIG. 7. However, content of processes in some of the steps are different, and therefore, descriptions thereof will be made hereinafter.

S1020

The reliability computation unit 205 obtains detection edge lists 320 and a luminance gradient value map obtained by an edge detection unit 204 to compute reliability of the detected edges. Here, although the reliability computation unit 205 computes the reliability in accordance with Equation 2, X is constantly 1.0 since the conversion images 311a to 311d have not subjected to size reduction in this embodiment. Similarly, also in step S1520 and step S1550, the edge selection unit 206 uses a magnification of 1.0.

Although the case where the PSFs are generated while a straight motion blur is assumed is described in this embodiment, the disclosure is not limited to this. A rotational motion blur or a curved motion blur may be assumed or a PSF of a combination of a plurality of motions may be generated.

As described above, according to the configuration of this embodiment, even in a case where an uneven image deterioration occurs in regions in a captured image, an edge which may be accurately compared may be selected. As a result, comparison with an edge of a target may be reliably performed so that a position and orientation is computed.

Specifically, the information processing apparatus 200 assumes a plurality of PSFs affected by a motion blur for a captured image, generates conversion images by performing the deblurring on PSFs, performs edge detection on the individual conversion images. The information processing apparatus 200 computes reliability of results of the edge detection based on sharpness of a luminance gradient values. The reliability indicates stability of the edge detection. The information processing apparatus 200 selects an edge having highest reliability in the edges detected in the plurality of conversion images as an optimum edge for each region. A comparison unit 103 computes a position and orientation of a target by comparing the selected edge with an edge of a defined 3D geometric model. By this, even in a case where uneven image deterioration is generated in regions in a captured image due to a motion blur, for example, comparison with an edge of the target is accurately performed so that a position and orientation is computed.

Modification

Although the image conversion unit 202 performs the deblurring a plurality of times in the third embodiment, the filter selection unit 203 described in the second embodiment may be additionally disposed. In this case, since the filters 401a to 401c (and the corresponding filters 402a to 402c) are applied to the conversion images 311a to 311d, 12 detection edge lists 320 ((4 types of conversion images)×(three types of filters)=12 types) are generated. Here, the conversion image ID 325 may uniquely identify a combination of a conversion image and a filter.

Fourth Embodiment

In this embodiment, an apparatus which may be employed in a case where comparison with an edge of a target is accurately performed so that a position and orientation is computed even when a motion blur occurs in a captured image due to a movement of an imaging unit 101 or a target will be described. This embodiment is different from the first embodiment in that an information processing apparatus 200 does not select edges after the edges are detected in all conversion images but performs size reduction on an image in a step-by-step manner until a predetermined number of edges are selected and performs edge detection and selection process. Even a method described in this embodiment may attain an effect equivalent to that of the first embodiment.

A functional configuration and the like of the robot system according to this embodiment are the same as those of the robot system according to the first embodiment illustrated in FIG. 2. Portions of control of this embodiment which are different from those of the first embodiment will be described hereinafter with reference to the flowchart of the first embodiment illustrated in FIG. 3.

S1020

An image conversion unit 202 performs size reduction on an input captured image 310 in a magnification which is currently set to generate a conversion image 311. Unlike step S1020 of the first embodiment, the image conversion unit 202 generates only one conversion image 311. When the process in step S1020 is performed for the first time, the image conversion unit 202 generates a conversion image 311a. When the process in step S1020 is performed in a second time after the information processing apparatus 200 performs a process until step S1050 is performed, the image conversion unit 202 generates a conversion image 311b based on the input captured image 310. Thereafter, the image conversion unit 202 successively generates conversion images which have different magnifications in descending order for individual repetitions based on the input captured image 310. Magnifications used for the size reduction in the second time onwards are set in step S1050.

S1030

An edge detection unit 204 performs an edge detection process on the single conversion image 311 converted in step S1020 to generate a detection edge list 320 and a luminance gradient value map. Unlike the first embodiment, the edge detection unit 204 generates only a single type of detection edge list and only a single type of luminance gradient value map for the single conversion image 311.

S1050

The edge selection unit 206 obtains the detection edge list 320 and selects an edge of a high reliability to newly generate a selection edge list 340. When a process in step S2050 is performed in a second time onwards, the edge selection unit 206 adds a selected edge to the selection edge list 340. Although the edge selection process is substantially the same as the process in step S1050 according to the first embodiment, only an operation of selecting an edge in the single conversion image 311 performed by the edge selection unit 206 is different.

Subsequently, when the number of selected edges is smaller than a preset value, the edge selection unit 206 multiplies the current magnification by 0.5 and returns to the process in step S1020. When the number of selected edges is larger than the preset value, the edge selection unit 206 proceeds to step S1060. Furthermore, also when the current magnification becomes smaller than a predetermined value, the edge selection unit 206 proceeds to step S1060.

Although the edge selection unit 206 determines whether a repetitive process is to be performed in accordance with the number of selected edges in this embodiment, the disclosure is not limited to this. The edge selection unit 206 may determine whether the repetitive process is to be performed based on distribution of the selected edges or a result of a determination as to whether a specific edge has been selected.

As described above, according to the configuration of this embodiment, even in a case where an uneven image deterioration occurs in regions in a captured image due to a motion blur or the like, an edge which may be accurately compared may be selected. As a result, comparison with an edge of a target may be reliably performed so that a position and orientation may be computed.

Specifically, the information processing apparatus 200 performs size reduction on an image in a step-by-step manner, generates a conversion image, and performs edge detection until a predetermined number of edges are selected. The information processing apparatus 200 computes reliability of results of the edge detection based on sharpness of luminance gradient values. The reliability indicates stability of the edge detection. When the reliability has reached a predetermined value, the information processing apparatus 200 selects an edge corresponding to the reliability. When the reliability has not reached the predetermined value, the information processing apparatus 200 further performs the size reduction on the image. A comparison unit 103 computes a position and orientation of a target by comparing a finally selected edge with an edge of a defined 3D geometric model. By this, even in a case where uneven image deterioration is generated in regions in a captured image due to a motion blur, for example, comparison with an edge of the target is accurately performed so that a position and orientation is computed.

Fifth Embodiment

In this embodiment, an apparatus which may be employed in a case where an edge of a target is accurately compared even when a motion blur occurs in a captured image due to a movement of an imaging unit 101 or a target will be described. Unlike the first embodiment, an edge model storage unit 104 stores information on a model edge as 2D information instead of 3D information in this embodiment. Furthermore, a comparison unit 103 estimates a position and orientation of a target in a 2D coordinate of an image. Therefore, the comparison unit 103 may perform edge comparison even on a target which does not have a 3D geometric model.

A functional configuration and the like of a robot system according to this embodiment are the same as those of the robot system according to the first embodiment illustrated in FIG. 2. Hereinafter, a difference from the first embodiment will be mainly described.

The comparison unit 103 obtains the selection edge list 340 generated by the edge selection unit 206 and a model edge list stored in the edge model storage unit 104, determines whether captured targets 301 are included in a captured image 310, and compares positions of images.

The edge model storage unit 104 stores a model edge list which is a group of model edge information. Unlike the first embodiment, the model edge information includes 2D edges and has the same data configuration as detection edge information 330. Furthermore, the model edge list also has the same data configuration as a detection edge list 320.

As described above, according to the configuration of this embodiment, even in a case where an uneven image deterioration occurs in regions in a captured image due to a motion blur or the like, an edge which may be accurately compared may be selected. As a result, comparison with an edge of a target may be reliably performed so that a position and orientation may be computed.

Specifically, the edge model storage unit 104 stores 2D model edge information. Furthermore, the comparison unit 103 estimates a position and orientation of a target in a 2D coordinate of an image. Accordingly, edge comparison is accurately performed even on a target which does not have a 3D geometric model.

Sixth Embodiment

In this embodiment, an information processing apparatus 200 includes an operation unit and a display unit as a hardware configuration. A user inputs an operation using the operation unit. The display unit displays an operation state for the user. By this, target comparison may be performed under a condition desired by the user.

A functional configuration and the like of the robot system according to this embodiment are the same as those of the robot system according to the first embodiment illustrated in FIG. 2. Hereinafter, a difference from the first embodiment will be mainly described.

The operation unit is realized by devices including a keyboard, a mouse, buttons, and a dial, receives a designation of a user as an operation, and transmits the designation to a CPU 10.

The display unit is realized by a device, such as a display, and displays an operation state of the apparatus according to this embodiment for the user in a visualized manner. Hereinafter, a function of the display unit will be described in detail.

Figure 9:
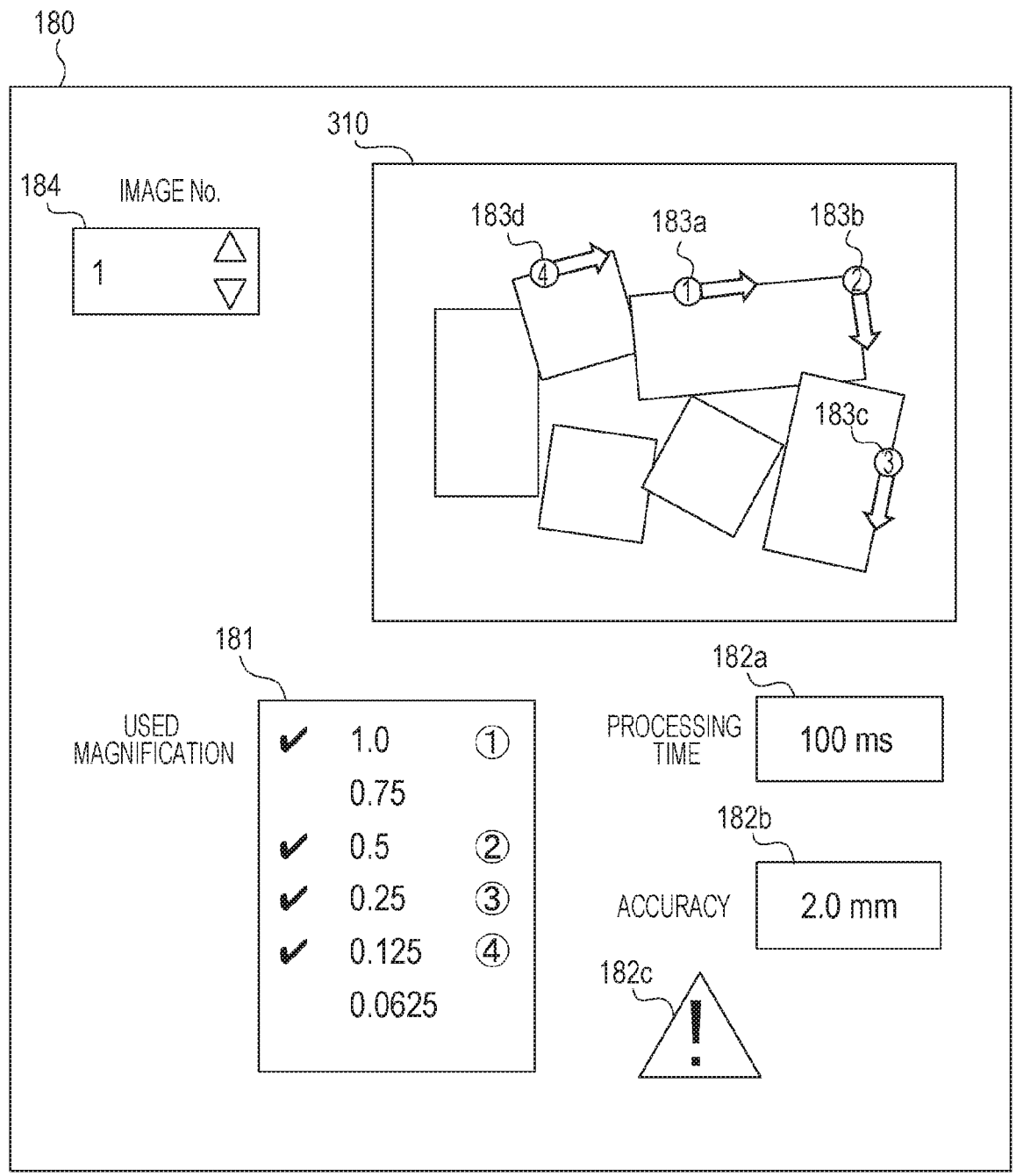
FIG. 9 is a diagram illustrating an example of a display screen displayed in a display unit.

FIG. 9 is a diagram illustrating an example of a display screen displayed in the display unit. The CPU 10 displays a window 180 in the display unit. In the window 180, a captured image 310, a checkbox 181 for specifying magnifications to be used, a current processing time 182a, an accuracy 182b, an alert 182c, selected edges 183a to 183d, and a specified image 184 are displayed.

The user operates the checkbox 181 to specify magnifications of conversion images 311a to 311d to be generated and used by an image conversion unit 202, an edge detection unit 204, and a reliability computation unit 205 of this embodiment. The example of FIG. 9 indicates that the user uses four types of magnification, that is, magnifications of 1.0, 0.5, 0.25, and 0.125.

As the number of types of magnification for generation of the conversion images 311 is increased, stability of edge detection is improved. However, a large number of types of magnification is disadvantageous in that a processing time is increased. Furthermore, when a small magnification is specified, resistance to a motion blur is improved. However, a small magnification is disadvantageous in that position accuracy in the edge detection is deteriorated. In this embodiment, since the user may select types of magnification to be used so that appropriate comparison may be performed depending on a situation.

The processing time 182a is a rough indication of a processing time and an accuracy 182b is a rough indication of accuracy which are represented by numerical values. Such a numerical value varies depending on content of selection in the checkbox 181. In a case where the processing time or an accuracy becomes larger than a predetermined value, it is likely that the information processing apparatus 200 may not achieve desired performance, and therefore, the CPU 10 displays the alert 182c which makes an alert for the user. The user checks the values 182a and 182b which indicate the rough indication of the processing time and the rough indication of the accuracy, respectively, to change a combination of magnifications and control the imaging condition of the imaging unit 101 and the operation speed and the like of the conveying unit 303. In this way, the performance of the information processing apparatus 200 may be improved.

In the window 180, the latest captured image 310 and the selected edges 183a to 183d which are superposed on the captured image 310 are displayed. The user changes a numerical value of the specified image 184 to specify the captured image 310 to be processed. The selected edge 183a to 183d visualize a selection edge information 350 finally selected by an edge selection unit 206 to display selection edge information 350 for the user. Arrow marks of the selected edges 183a to 183d indicate selection edge coordinates 352 and selection edge directions 353, and numerical values at roots of the arrow marks indicate selection image IDs 354. The numerical values correspond to numerical values indicated in the checkbox 181. The user may check the magnification of the conversion image 311 and the selection edge display which are associated with each other.

The user sets an operation condition of the information processing apparatus 200 by a method described as follows. The user operates the checkbox 181 to select a number of the magnifications displayed as options. The processing time display 182a and the accuracy 182b are changed depending on a combination of the selected magnifications. Furthermore, in a case where a processing time or an accuracy is larger than a predetermined value, the alert 182c is displayed. In this case, the user is prompted to change a combination of magnifications by selecting magnifications again. The user performs the operation while the following items are checked to control the operation condition of the information processing apparatus 200.

First, if a sufficient number of edges with sufficient density are displayed in outlines of the targets 301, a combination of magnifications currently specified is appropriate. If the number of selected edges 183 is small or the number of selected edges 183 is locally uneven, it is likely that a sufficient number of edges are not detected due to image deterioration. In this case, the user takes into account selection of smaller magnifications.

Then, if values added to the selected edges 183 satisfy numerical values displayed in the checkbox 181, a combination of specified magnifications is appropriate. If the numerical values displayed in the checkbox 181 are not included in the numerical values added to the selected edges 183, it is likely that an unrequired magnification has been specified. In this case, the user may remove the magnification from the options.

Thereafter, it is determined whether the processing time 182a and the accuracy 182b have been appropriately set. In a case whether the processing time 182a is longer than a required time, the user may perform an operation of reducing the number of magnifications to be selected, an operation of cancelling a largest magnification, or the like. In a case where the accuracy 182b is higher than a required accuracy, the user may perform an operation of reducing the number of smaller magnifications or the like.

Thereafter, the specified image 184 is successively changed, and it is determined whether the items above are satisfied in the plurality of types of captured image 310.

As described above, the user may immediately check an effect of a change of a combination of magnifications. The user may control the information processing apparatus 200 to attain an appropriate operation by repeatedly performing the check described above.

Although the case where the selected edges 183a to 183d indicate that the selection image ID 354 varies depending on the numerical values attached to the arrow marks as an example, the aspect of the embodiments is not limited to this. The CPU 10 may indicate the selection edge coordinate 352 and the selection edge direction 353 by symbols other than the arrow marks or may indicate a difference of the selection image ID 354 by a type of color or symbol.

Although the method for controlling a processing time and an accuracy of the information processing apparatus 200 by changing a combination of selected magnifications performed by the user is described in this embodiment, the disclosure is not limited to this. The user may input a desired processing time and a desired accuracy as the processing time 182a and the accuracy 182b, the CPU 10 may compute an appropriate combination of magnifications to be used, and a result of the computation may be displayed in the checkbox 181.

Although the method for controlling a processing time and an accuracy of the information processing apparatus 200 by changing a combination of selected magnifications performed by the user is described in this embodiment, the disclosure is not limited to this. The user may specify a largest magnification or a smallest magnification and the CPU 10 may compute an appropriate combination of magnifications to be used in a range of the largest and smallest magnifications.

Although the method for controlling a processing time and an accuracy of the information processing apparatus 200 by changing a combination of selected magnifications performed by the user is described in this embodiment, the disclosure is not limited to this. In a case where the operation unit and the display unit of this embodiment are realized based on a configuration described in the second embodiment, the user may select a filter size and the display unit may perform display in accordance with the selection.

As described above, with the configuration of this embodiment, the user may perform a target comparison under a desired condition.

Specifically, the information processing apparatus 200 of this embodiment includes the operation unit and the display unit as a hardware configuration. Then the operation unit accepts a user operation and the display unit displays an operation state for the user. By this, a target may be held or placed under a condition desired by the user or at a timing desired by the user.

Although examples of the embodiments of the disclosure have been described in detail hereinabove, the disclosure is not limited to the specific embodiments.

For example, the comparison unit 103 and the edge model storage unit 104 may be included in the information processing apparatus 200.

Furthermore, a portion of or all the functional configuration of the information processing apparatus 200 described above may be implemented in the information processing apparatus 200 as a hardware configuration.

Moreover, a plurality of CPUs may be disposed as a hardware configuration of the information processing apparatus 200, and the plurality of CPUs may execute processes based on programs stored in a memory. In addition, a graphics processing unit (GPU) may be used instead of the CPU as a hardware configuration of the information processing apparatus 200.

Any device may be used as the image input unit 201 as long as the device may input an image captured by the imaging unit 101 to the information processing apparatus 200. Furthermore, any type of image, such as an RGB color image, a grayscale image, or a monochrome image, may be input as a captured image. In a case where the imaging unit 101 obtains a range image and a 3D point group, the image input unit 201 inputs the range image and the 3D point group to the information processing apparatus in addition to the captured image.

Furthermore, any unit may be employed as the image conversion unit 202 as long as the unit may perform image processing on a captured image to generate a conversion image. Although the case where the enlargement, the size reduction, or the deblurring is performed as the image processing to be employed is described as an example, other processes may be employed.

Furthermore, any unit may be employed as the edge detection unit 204 as long as the unit may detect an edge in a predetermined image. In the second embodiment, a case where the Prewitt filter, the Sobel filter, and the Laplacian filter are employed is described as an example.

Furthermore, any device may be employed as the reliability computation unit 205 as long as the unit may define certainty and stability of edge detection. In the first embodiment, the method for calculating certainty and stability of the edge detection based on a luminance gradient different in three points while sharpness of a luminance gradient value in the vicinity of an edge is defined as a reliability is described.

Furthermore, any unit may be employed as the edge model storage unit 104 as long as the unit may define and store edge information of the targets 301. In the first embodiment, model edge information defined by a 3D geometric model of the targets 301 is described. In the fifth embodiment, the case where the edge detection is performed on the image obtained by capturing the targets 301 so that the model edge information is generated is described.

As described above, according to the configurations of the embodiments described above, even in a case where uneven image deterioration occurs in regions in a captured image due to a motion blur or the like, an edge to be subjected to comparison may be reliably selected. As a result, comparison with an edge of a target may be reliably performed so that a position and orientation is computed.

According to the aspect of the embodiments, even in a case where uneven image deterioration occurs in regions in a captured image, an edge to be compared may be reliably selected.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions.

This application claims the benefit of Japanese Patent Application No. 2018-106096 filed Jun. 1, 2018, which is hereby incorporated by reference herein in its entirety.

What is claimed is:

1. An apparatus, comprising:
an input unit configured to input a captured image of a target;
a generation unit configured to generate a plurality of conversion images based on the captured image;
a detection unit configured to detect edges in the plurality of conversion images;
a determination unit configured to determine reliability of a plurality of edges detected in corresponding regions of the conversion images and the captured image based on sharpness of luminance gradient values in the vicinity of the edges; and
a selection unit configured to select one of the edges for each region in the captured image based on the determined reliability.

2. The apparatus according to claim 1, further comprising:
a storage unit configured to store an edge of the target; and
a comparison unit configured to compare the selected edge with the stored edge to obtain a position and orientation of the target.

3. The apparatus according to claim 1, wherein the generation unit generates a plurality of conversion images by changing a size of the captured image in different magnifications.

4. The apparatus according to claim 3, further comprising a setting unit configured to set the different magnifications.

5. The apparatus according to claim 4, wherein the setting unit sets the different magnifications based on a user operation performed through a screen.

6. The apparatus according to claim 1, wherein the generation unit performs transform a plurality of times for debluring on the captured image to generate the plurality of conversion images.

7. A robot system, comprising:
the apparatus according to claim 1;
an imaging unit configured to capture an image of a target; and
a holding unit configured to perform a holding operation on the target.

* * * * *